United States Patent
Kawaguchi et al.

(10) Patent No.: US 8,773,309 B2
(45) Date of Patent: Jul. 8, 2014

(54) POSITIONAL INFORMATION TRANSMITTER, POSITIONAL INFORMATION RECEIVER, AND POSITION MEASURING SYSTEM

(75) Inventors: Takamasa Kawaguchi, Yokohama (JP); Tomoichi Ebata, Machida (JP); Takayoshi Fujioka, Narashino (JP)

(73) Assignee: Hitachi, Ltd., Tokyo (JP)

(*) Notice: Subject to any disclaimer, the term of this patent is extended or adjusted under 35 U.S.C. 154(b) by 519 days.

(21) Appl. No.: 13/019,619

(22) Filed: Feb. 2, 2011

(65) Prior Publication Data

US 2011/0260915 A1 Oct. 27, 2011

(30) Foreign Application Priority Data

Apr. 23, 2010 (JP) ................................ 2010-099940

(51) Int. Cl.
*G01S 1/68* (2006.01)
*G01S 19/11* (2010.01)
*G01S 19/31* (2010.01)

(52) U.S. Cl.
USPC ................ 342/386; 342/357.48; 342/357.71

(58) Field of Classification Search
CPC ......... G01S 19/46; G01S 19/48; G01S 19/22; G01S 19/31; G01S 19/11; G01S 1/68; G01S 5/0236
USPC .................. 342/386, 357.29, 357.31, 357.61, 342/357.71, 357.48
See application file for complete search history.

(56) References Cited

U.S. PATENT DOCUMENTS

| | | | |
|---|---|---|---|
| 7,948,437 B2 * | 5/2011 | Torimoto et al. | ............. 342/386 |
| 2009/0115661 A1 | 5/2009 | Torimoto et al. | |
| 2009/0256742 A1 | 10/2009 | Kawaguchi et al. | |
| 2010/0194636 A1 | 8/2010 | Ebata et al. | |

FOREIGN PATENT DOCUMENTS

| | | |
|---|---|---|
| EP | 2 233 943 A1 | 9/2010 |
| JP | 2007-278756 | 10/2007 |
| JP | 2009-133731 | 6/2009 |
| JP | 2010-038850 | 2/2010 |

* cited by examiner

*Primary Examiner* — Cassie Galt
(74) *Attorney, Agent, or Firm* — Foley & Lardner LLP

(57) ABSTRACT

The present invention provides a positional information transmitter, a positional information receiver and a position measuring system capable of measuring a position under moving circumstances. The positional information transmitter transmits positional information for specifying the current position. The positional information transmitter comprises a memory unit which stores therein a plurality of first positional information indicative of the latitude of the current position and a plurality of second positional information indicative of the longitude of the current position, a transmission unit which generates a first positional information signal corresponding to a wireless signal including the first positional information stored in the memory unit and a second positional information signal corresponding to a wireless signal including the second positional information stored therein, and transmits the generated first and second positional information signals, and a timing controller which controls the transmission unit in such a manner that the transmission unit repeatedly transmits the first positional information signal in different periods and repeatedly transmits the second positional information signal in different periods.

11 Claims, 12 Drawing Sheets

FIG. 5

| POSITIONAL INFORMATION | WIRELESS TRANSMISSION SECTION | PRN NUMBER |
|---|---|---|
| (x1) | WIRELESS TRANSMISSION SECTION (1) | 173 |
| (x1) | WIRELESS TRANSMISSION SECTION (2) | 174 |
| (y1) | WIRELESS TRANSMISSION SECTION (3) | 175 |
| (y1) | WIRELESS TRANSMISSION SECTION (4) | 176 |
| (z1) | WIRELESS TRANSMISSION SECTION (5) | 177 |
| (z1) | WIRELESS TRANSMISSION SECTION (6) | 178 |

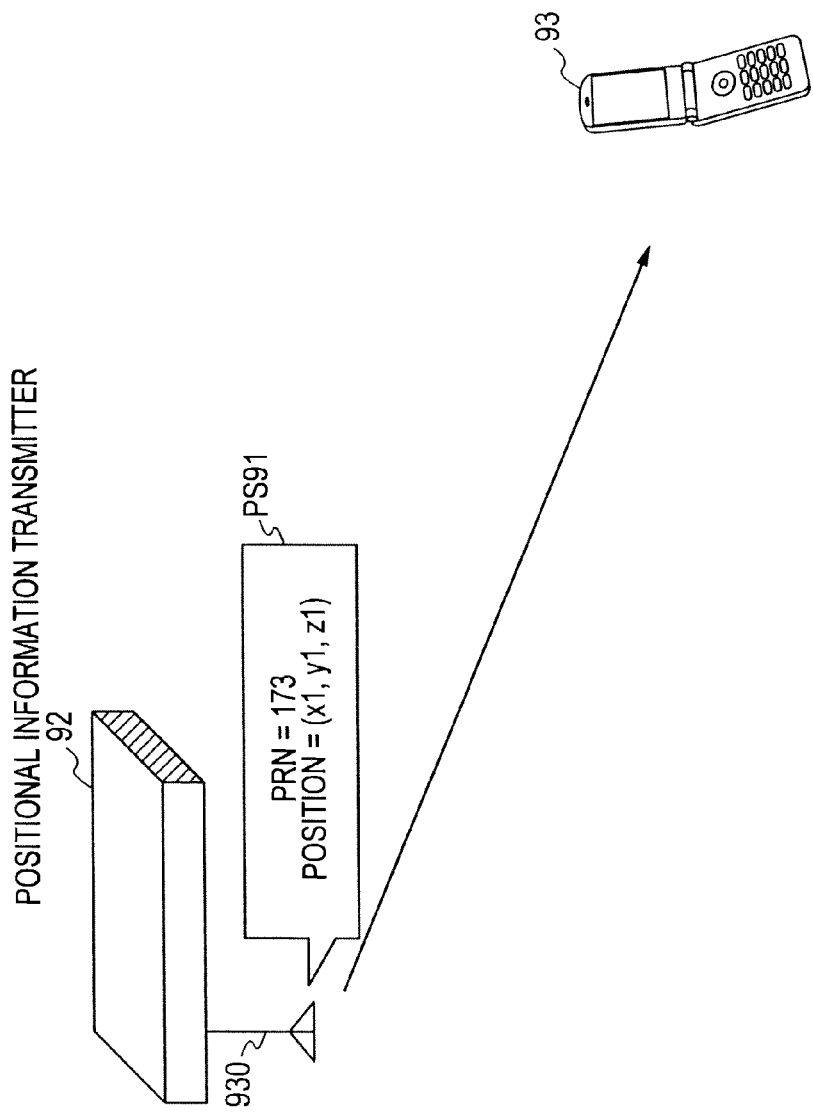

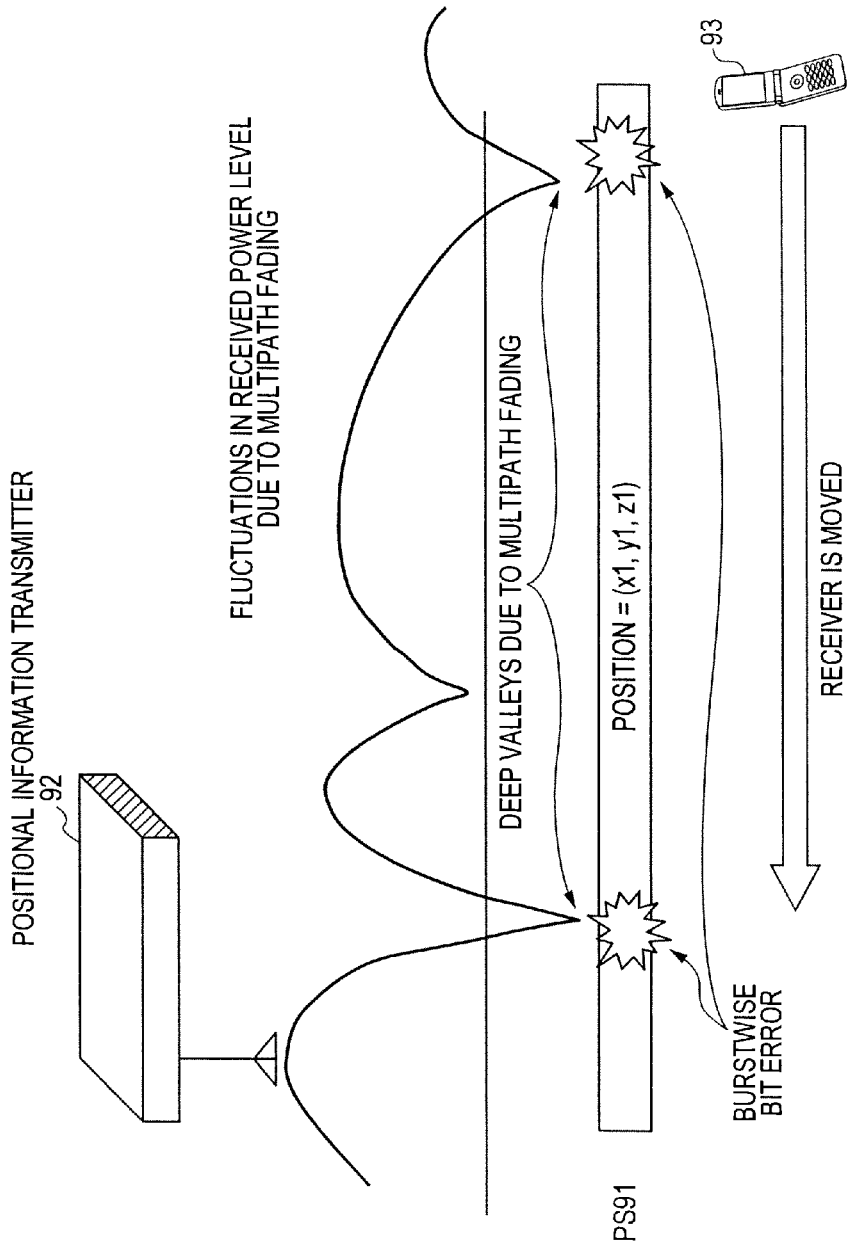

POSITIONAL INFORMATION TRANSMITTER, POSITIONAL INFORMATION RECEIVER, AND POSITION MEASURING SYSTEM

CLAIM OF PRIORITY

The present application claims priority from Japanese application serial no. JP2010-099940, filed on Apr. 23, 2010, the content of which is hereby incorporated by reference into this application.

BACKGROUND OF THE INVENTION

The present invention relates to a positional information transmitter, a positional information receiver and a position measuring system which acquire the current position of each portable terminal indoors or the like, where radio waves sent from satellites cannot be caught.

In a system which performs positioning using wireless signals (hereinafter called "satellite positioning signals") transmitted from satellites such as a Global Positioning System (GPS) satellite, etc., the accuracy of positioning is degraded or positioning is disabled where portable terminals such as GPS receivers or the like are located in areas such as indoors, underground malls, etc., where the satellite positioning signals cannot be received.

As solutions to the above, there has been disclosed in, for example, Japanese Unexamined Patent Publication No. 2007-278756, a technology wherein positional information transmitters (indoor transmitters) which respectively transmit positional information being information indicative of positions in the form of signals (hereinafter called "positional information signals") each compatible with a frequency (e.g., center frequency 1.57542 GHz), a modulation system (specifically, Binary Phase-Shift Keying (BPSK)), a multiple access method (specifically, Code Division Multiple Access (CDMA) of direct-spectrum diffusion method), etc. used in GPS, are installed in areas such as indoors, underground malls, etc., where satellite positioning signals cannot be received, and portable terminals such as cellular phones, etc. acquire their own current positions from the received positional information signals. Further, there has been disclosed in Japanese Unexamined Patent Publication No. 2009-133731, a technology that shortens the time taken until the acquisition of positional information.

Such positioning using the positional information signals as described above is different from the positioning based on the satellite positioning signals. Each portable terminal takes a position included in the received positional information signals as its own current position as it is without performing complex positioning calculations. Therefore, the positional information transmitters are installed at intervals corresponding to the required accuracy of positioning and adjust their outputs in such a manner that the transmitted positional information signals are not detected from faraway places. For example, when the positional information transmitters are installed at 10 m intervals, their outputs are adjusted in such a manner that the range of detection of each positional information signal falls from 10 m to 15 m in radius.

Thus, since many positional information transmitters are instanced adjacent to one another in the case of the positioning using the positional information signals, it is desirable that Pseudo Random Noise (PRN) numbers for selecting code patterns used in spectrum diffusion are prevented from overlapping between the adjacent positional information transmitters in order to avoid interference between the positional information signals. The number of PRN numbers available indoors is, however, limited to be 10 or so in advance.

However, when positional information signals transmitted from positional information transmitters installed in the ceilings lying indoors and in underground malls are received by, for example, a portable terminal held at about human chest height, multipath occurs due to interference with reflected waves from the floor surface and the like. At this time, multipath fading during which the received signals become extremely weak, occurs where the portable terminal is moving, thereby causing burst bit errors.

FIGS. 11 and 12 are respectively image diagrams each showing the relationship between the distance from a transmission source and received power at the time that a portable terminal 93 using a prior art is moved while receiving radio waves (in a 1.57542 GHz band) of positional information signals each compatible with a GPS satellite positioning signal.

As shown in FIG. 11, a large number of positional information transmitters 92 (only one is described as one example in FIG. 11) are installed in the ceiling planes lying indoors or the like where the satellite positioning signals cannot be received, at intervals corresponding to the required accuracy of positioning. The positional information transmitter 92 includes antennas 930 provided more than at least one. The positional information transmitter 92 transmits a positional information signal PS91 which includes positional data indicative of the position of installation thereof and is compatible with the satellite positioning signal, from the antenna 930. The speed of the positional information signal PS91 is slow at 50 bps. The transmitted positional information signal PS91 is spectrum-diffused according to code patterns of PRN numbers and modulated to a carrier of a predetermined frequency band, followed by being transmitted.

Described concretely, a positional information signal PS91 spectrum-diffused (encoded) in a code pattern relative to a PRN number 173 and including positional data (x1, y1, z1) indicative of the longitude, latitude and altitude is transmitted from the corresponding antenna 930 of the positional information transmitter 92. When the positional information transmitter 92 has a plurality of antennae 930, positional information signals transmitted from the respective antennas 930 respectively use PRN numbers different from those for satellite positioning (i.e., they are encoded by different code patterns), thus causing no interference between the positional information signals. Thus, when a plurality of positional information transmitters 92 exist within the range of radio wave propagation, a portable terminal 93 receives positional information signals corresponding to a plurality of PRN numbers.

If the plural PRN numbers are PRN numbers utilized for indoor positioning where the portable terminal 93 has received the positional information signals corresponding to the PRN numbers, then the portable terminal 93 selects only one having the maximum received signal strength out of all the positional information signals received and measures its own position as (x1, y1, z1) from positional data contained in the selected positional information signal.

However, even when the positional information signal corresponding to the PRN number 173 is transmitted to the portable terminal 93, for example, the positional information signal may not be received properly. When a positional information signal PS91 indicative of the latitude, longitude and altitude (x1, y1, z1) is received from an antenna 930 of a positional information transmitter 92 as shown in FIG. 12, for example, normally, frames corresponding to the four are taken, 120 bits in total are taken as the amount of data, and a time of about 2.4 seconds is taken. Thus, when the portable terminal 93 is moving, it falls into valleys of received power due to multipath fading at the timing at which the received power of the portable terminal 93 falls suddenly. Since the positional information signal encounters burstwise bit errors in this case, the portable terminal 93 is not able to receive the positional information signal.

Thus, the prior art is accompanied by the problems that when, for example, the portable terminal moves over the range of detection of each positional information signal, having a radius ranging from about 10 m to about 15 m at about 4 km/h, burstwise bit errors occur due to the effects of multipath fading even if the positional information signal transmitted from the positional information transmitter 92 cannot be captured or vice versa, and hence the position may not be measured appropriately while the portable terminal is being moved without the positional information being able to get.

SUMMARY OF THE INVENTION

The present invention has been made to solve the foregoing problems. An object of the present invention is to provide a positional information transmitter, a positional information receiver and a position measuring system capable of measuring a position under moving circumstances.

According to one aspect of the present invention, for achieving the above object, there is provided a positional information transmitter which transmits positional information for specifying a current position, comprising a memory unit which stores therein a plurality of first positional information indicative of the latitude of the current position and a plurality of second positional information indicative of the longitude of the current position; a transmission unit which generates a first positional information signal corresponding to a wireless signal including the first positional information stored in the memory unit and a second positional information signal corresponding to a wireless signal including the second positional information and transmits the generated first and second positional information signals; and a timing controller which controls the transmission unit in such a manner that the transmission unit repeatedly transmits the first positional information signal in different periods and repeatedly transmits the second positional information signal in different periods.

According to another aspect of the present invention, for achieving the above object, there is provided a positional information receiver which receives positional information for specifying a current position, comprising a reception section which repeatedly receives, in different periods, a first positional information signal being a wireless signal including a plurality of first position information indicative of the latitude of the current position from a positional information transmitter transmitting the positional information and repeatedly receives, in different periods, a second positional information signal being a wireless signal including a plurality of second positional information indicative of the longitude of the current position from the positional information transmitter; a decoding unit which sequentially decodes the first and second positional information signals repeatedly received from the reception section in the different periods; and an output processing unit which sequentially outputs the first and second positional information signals decoded by the decoding unit.

According to a further aspect of the present invention, for achieving the above object, there is provided a position measuring system equipped with the positional information transmitter and the positional information receiver.

According to the present invention, there can be provided a positional information transmitter, a positional information receiver and a position measuring system capable of measuring a position under moving circumstances.

BRIEF DESCRIPTION OF THE DRAWINGS

FIG. 5 is a diagram illustrating a data configuration example of a positional information table;

FIG. 11 is a diagram illustrating the relationship between the distance from a transmission source and received power where a portable terminal using a prior art is moved while receiving each positional information signal; and FIG. 12 is a diagram showing the manner in which the portable terminal using the prior art receives a positional information signal indicative of the latitude, longitude and altitude (x1, y1, z1) from an antenna of a positional information transmitter.

DETAILED DESCRIPTION OF THE PREFERRED EMBODIMENTS

Embodiments of a positional information transmitter, a position measuring system and a positional information receiver according to the present invention will hereinafter be described in detail with reference to the accompanying drawings.

Figure 1:
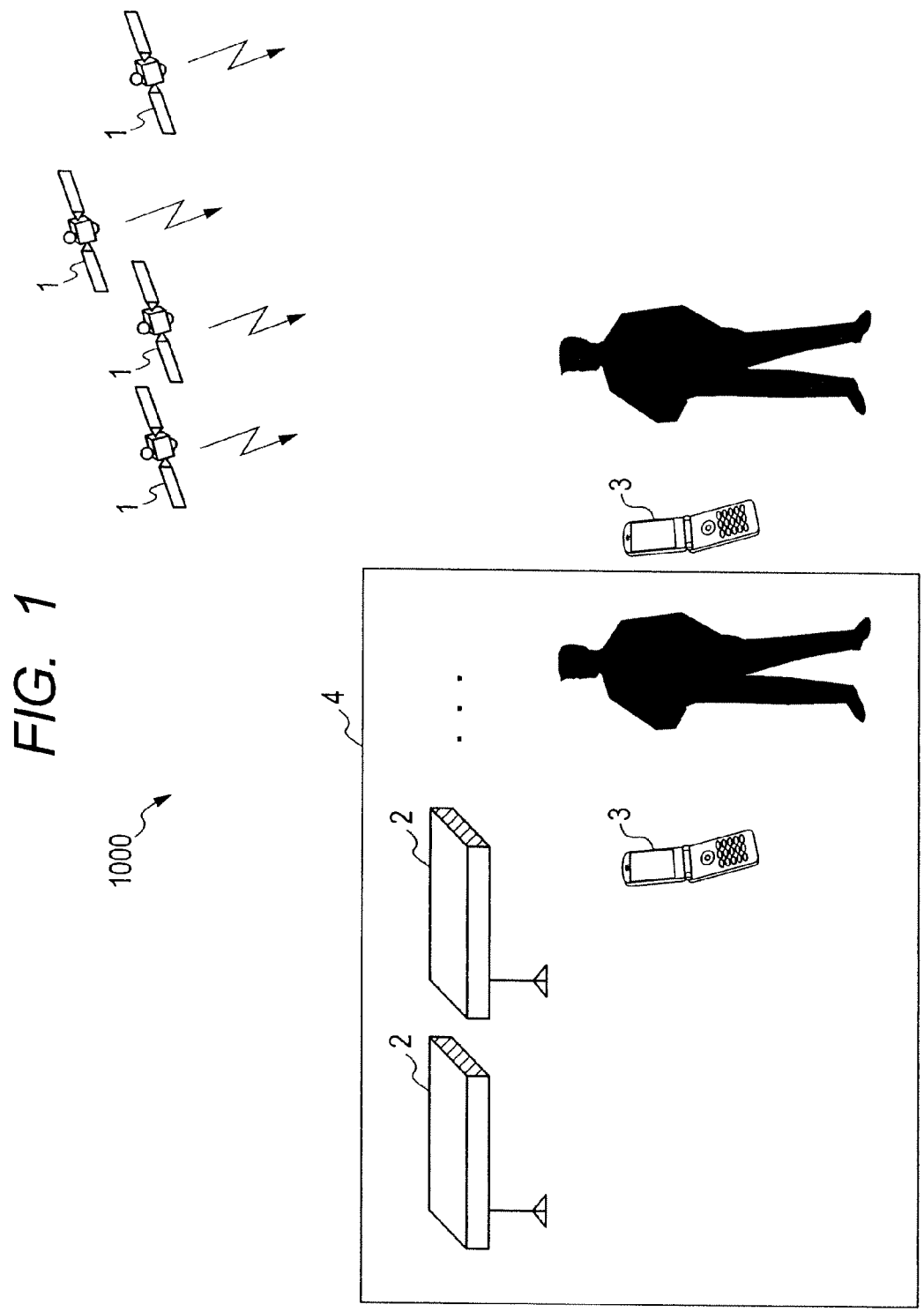
FIG. 1 is an image diagram showing a configuration of a position measuring system according to an embodiment of the present invention.

FIG. 1 is an image diagram showing a configuration of a position measuring system 1000 according to an embodiment of the present invention. As shown in FIG. 1, the position measuring system 1000 includes a plurality of satellites 1 which transmit wireless signals (satellite positioning signals) for positioning to the earth or ground, a plurality of positional information transmitters 2 which respectively transmit positional information signals being positioning signals including positional data of one spot of the earth (including indoor, an underground mall, etc.), a portable terminal 3 which measures its own current position, based on the positioning signals from the satellites 1 and the positional information transmitters 2, and a structure 4 such as a building, an underground mall or the like where it is difficult for the satellite positioning signals to penetrate. Incidentally, although the portable terminal 3 has been explained below in a state in which a user has walked and moved, the portable terminal 3 may be placed in a state of being moving, like the movement by a vehicle and the like.

The satellite 1 is of a satellite based on a positioning system such as a GPS, a Galileo Positioning System, a Global Navigation Satellite System (GLONASS), a Quazi-Zenith Satellites system or the like. Incidentally, although the following description is made assuming that the satellites 1 are GPS satellites and the satellite positioning signals transmitted from the satellites 1 are GPS signals such as an L1 signal (1575.42 MHz), an L2 signal (1227.6 MHz), etc., they are not limited thereto in particular.

Each of so-called navigation messages is contained in the satellite positioning signal transmitted from each of the satellites 1. The navigation message contains, for example, 25 frames over its entirety. Each frame contains five subframes. Each subframe is comprised of 10 words. On word is composed of 30 bits. Each of the subframes includes, for example, correction information on a satellite clock, precise orbital information (the ephemeris), outline orbit information (almanac), ionospheric correction information, Coordinated Universal Time (UTC) correction information, satellite's health information, etc.

These navigation messages are spectrum-diffused to Pseudo Random Noise Codes in inherent code patterns assigned per satellite 1 and BPSK-modulated to carriers lying in a predetermined frequency band. Numbers applied to the individual code patterns for generating the Pseudo Random Noise Codes are referred to as PRN numbers. The different PRN numbers are allocated to the satellites 1 respectively. Therefore, the PRN numbers are also used as numbers for identifying satellites or identifying transmission channels of positioning signals. Namely, a plurality of independent channels are configured by spectrum diffusion.

The positional information signal sent from each of the positional information transmitters 2 has compatibility with the satellite positioning signal transmitted to the earth from the satellite 1. Data having a similar frame configuration is sent as a wireless signal in accordance with the same modulation scheme as for the satellite positioning signal. However, though the positional information transmitters 2 are installed in the same area in large numbers, the number of PRN numbers usable by the positional information transmitters 2 is defined to be 10 or so at most. Therefore, the same PRN number is used to be shared with a plurality of the positional information transmitters 2 within a signal interference-free range.

Figure 2:
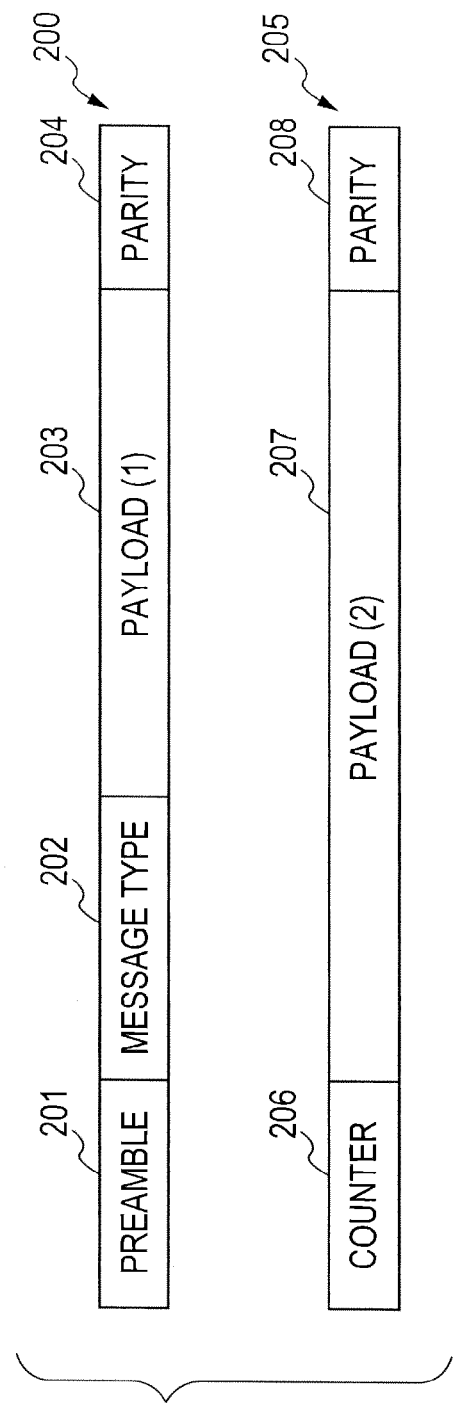
FIG. 2 is a diagram illustrating a frame configuration of a positional information signal transmitted and received between a positional information transmitter and a portable terminal.

FIG. 2 is a diagram showing a frame configuration of a positional information signal transmitted and received between a positional information transmitter 2 and a portable terminal 3. As shown in FIG. 2, the positional information signal is comprised of one or plural subframes. Specifically, since the positional information signal has compatibility with the satellite positioning signal, the positional information signal is composed, including frames 200 and 205 with 30 bits as one frame, for example. The frame 200 is comprised of 30 bits, including a preamble 201, a message type 202, a payload 203 and a parity 204. The frame 205 is composed of 30 bits, including a counter 206, a payload 207 and a parity 208.

The preamble 201 is a specific bit string for detecting the positional information signal by the portable terminal 3. The message type 202 indicates the type of positional information stored in each of the payloads 203 and 207, e.g., (x1) or the like. The message type 202 indicates whether it is of a message completed in the frame 200 or indicates whether the frame 205 is also required.

When the amount of data of the positional information signal is less than or equal to the number of bits for the payload 203, the frame 200 is repeatedly transmitted from the positional information transmitter 2. On the other hand, when the amount of data of the positional information signal is greater than the number of the bits for the payload 203, the frames 200 and 205 are repeatedly transmitted pairwise from the positional information transmitter 2. Incidentally, each of the parities 204 and 208 indicates the presence or absence of a bit error in the positional information signal.

The portable terminal 3 is of a portable terminal such as a GPS cellular phone, a Personal Navigation Device (PND) or the like, which receives a positioning signal from the satellite 1 or the positional information transmitter 2 to measure its own present position.

Figure 3:
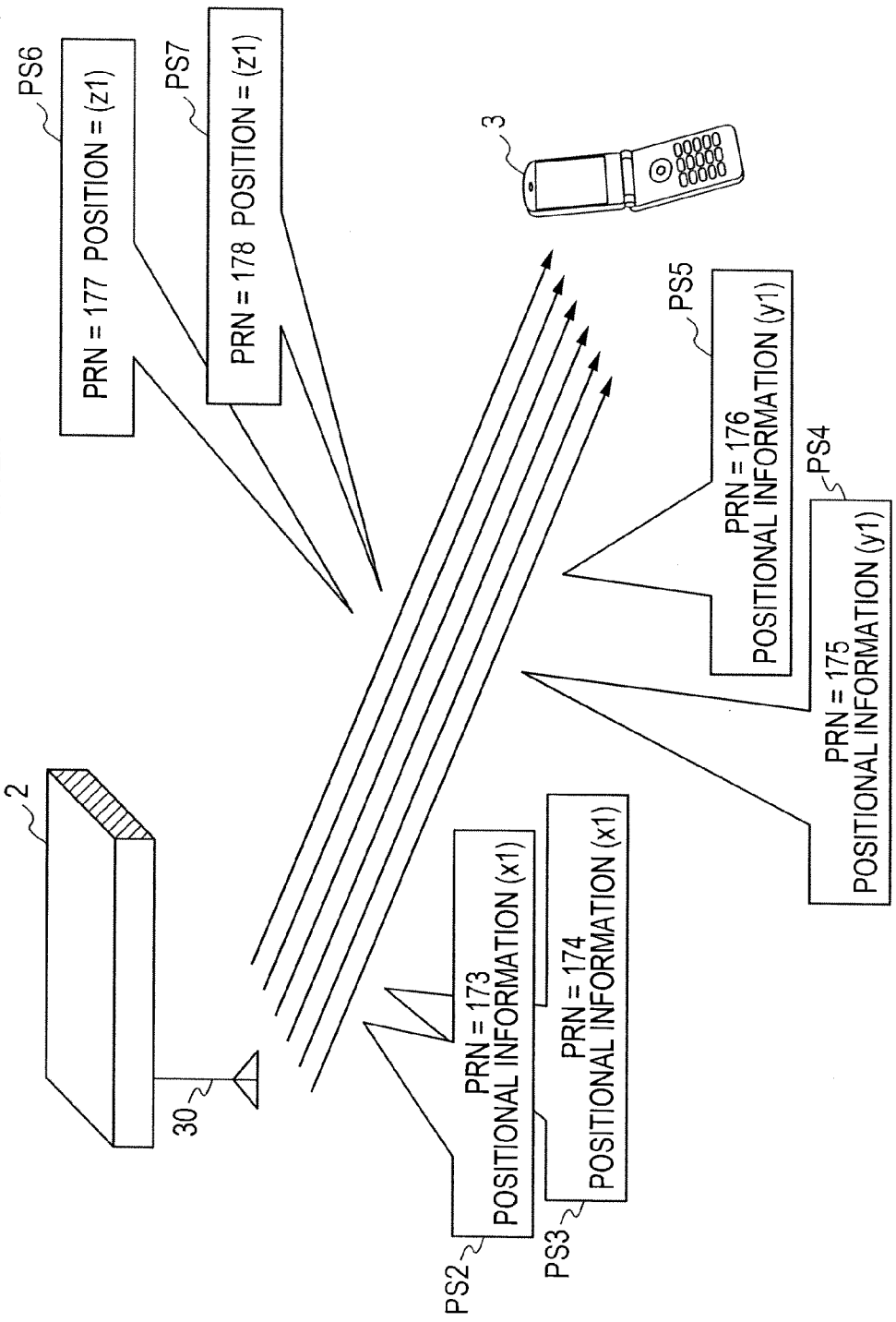
FIG. 3 is an explanatory diagram depicting the principle of operation of a positional information transmitter according to the embodiment of the present invention.

FIG. 3 is an explanatory diagram showing the principle of operation of the positional information transmitter 2 according to the embodiment of the present invention. A large number of positional information transmitters 2 are installed in a ceiling plane lying indoors where a satellite positioning signal cannot be received, at intervals corresponding to the required accuracy of positioning (only one is typically shown in FIG. 3). The respective positional information transmitters 2 are equipped with antennas 30 more than at least one. Positional information signals each including positional data indicative of the position of installation of the corresponding positional information transmitter 2 and having compatibility with the satellite positioning signal, are transmitted from the antenna 30.

At this time, a plurality of positional information signals from positional information signals PS1 through PS7 are transmitted as the positional information signals transmitted from the antenna 30 of the positional information transmitter 2. The positional information signals PS1 through PS7 are respectively spectrum-diffused according to code patterns of PRN numbers different from one another and modulated into carriers in a predetermined frequency band, followed by being transmitted.

For instance, the positional information signals PS2 and PS3 respectively spectrum-diffused in six code patterns from PRN numbers 173 to 178 and encoded in the code patterns of the PRN numbers 173 and 174 are transmitted from the antenna 30 of the positional information transmitter 2 inclusive of positional data (x1) indicative of the same longitude respectively. In a manner similar to it, the positional information signals PS4 and PS5 encoded in the code patterns of the PRN numbers 175 and 176 are transmitted therefrom inclusive of positional data (y1) indicative of the same latitude. Further, the positional information signals PS6 and PS7 encoded in the code patterns of the PRN numbers 175 and 176 are transmitted inclusive of positional data (z1) indicative of the same altitude.

Since these positional information signals transmitted are respectively encoded according to the PRN numbers different from one another, i.e., the code patterns different from one another, no interference occurs between the signals. Thus, if there are no effects such as the multipath fading, etc., then the portable terminal 3 receives therein all of these six positional information signals PS2 through PS7.

Figure 4:
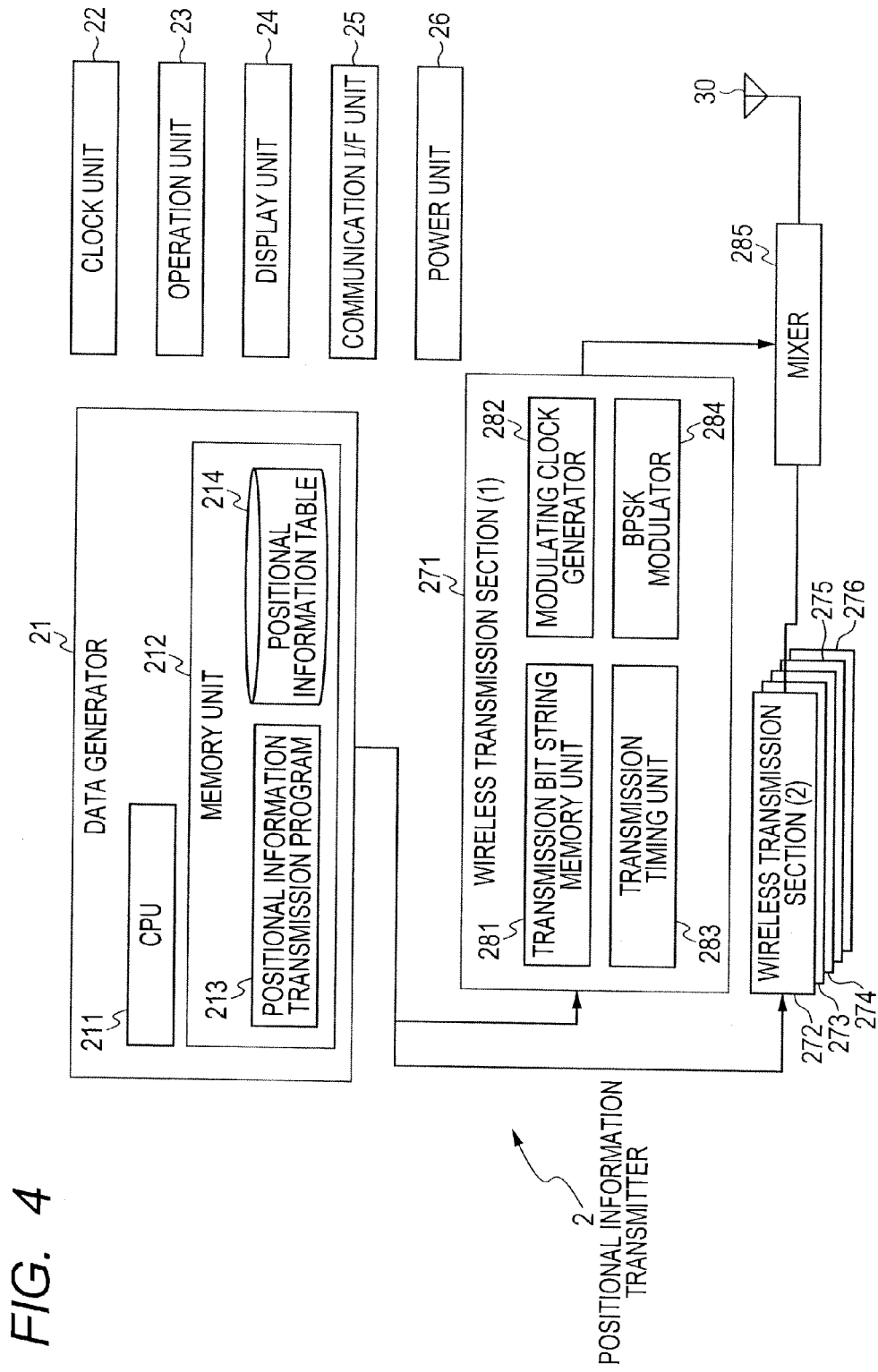
FIG. 4 is a block diagram showing a functional configuration of the positional information transmitter shown in FIG. 1.

FIG. 4 is a block diagram showing a functional configuration of the positional information transmitter 2 shown in FIG. 1. As shown in FIG. 4, the positional information transmitter 2 includes an antenna 30, a data generator 21, a clock unit 22, an operation unit 23, a display unit 24, a communication I/F (Interface) unit 25, a power unit 26, a wireless transmission section (1) 271, and wireless transmission sections (2) 272 through (6) 276.

The clock unit 22 generates a clock signal (e.g., 20 MHz) for operating the data generator 21. The operation unit 23 is a user interface for performing an operation input to the positional information transmitter 2 and includes control buttons or switches. The display unit 24 is a user interface for displaying various information necessary for confirmation or the like of the operation input of the positional information transmitter 2, the state of its operation and the like. As the display unit 24, there are mentioned, for example, a liquid crystal monitor and a Light Emitting Diode (LED). The communication I/F unit 25 is a communication interface for coupling the positional information transmitter 2 to external devices such as other computers or the like. As the communication I/F unit 25, there are mentioned, for example, RS-232C, a Universal Asynchronous Receiver Transmitter (UART), an Open Collector, Transistor-Transistor Logic (TTL), a parallel I/F, and a Universal serial Bus (USB). An unillustrated computer coupled via the communication I/F unit 25 performs the registration of data in a positional information table 214 and its maintenance. The power unit 26 supplies drive power to respective parts of the positional information transmitter 2.

The data generator 21 includes a CPU 211 and a memory unit 212. A positional information transmission program 213 for causing the CPU 211 to make a load to an unillustrated memory and execute its load thereby to embody a positional information transmitting function to be described later, and a positional information table 214 set in advance by a manager or the like have been stored in the memory unit 212.

FIG. 5 is a diagram showing a data configuration example of the positional information table 214. As shown in FIG. 5, positional information 800, a wireless transmission section 801, and a PRN number 802 are stored, associated with each other, in the positional information table 214. For example, positional information (x1), a wireless transmission section (1) and a PRN number 173 are stored in a data string 803 in a matched relationship. The positional information (x1), a wireless transmission section (2) and a PRN number 174 are stored in a data string 804 in a matched relationship. In a manner similar to the above, positional information (y1) and (z1) are also stored, associated with the wireless transmission section 801 and the PRN number 802, in the positional information table 214. Incidentally, the positional information (x1), (y1) and (z1) are coordinates each of which indicates the position where the positional information transmitter 2 is installed. They are information set in advance by the manager or the like.

Consequently, returning back to FIG. 4, the wireless transmission section (1) (271) will be explained. As shown in FIG. 4, the wireless transmission section (1) (271) includes a transmission bit string memory unit 281, a modulating clock generator 282, a transmission timing controller 283 and a carrier generator 284. Incidentally, although only the wireless transmission section (1) (271) is explained below, the wireless transmission sections (2) (272) through (6) (276) are also respectively assumed to be provided with a configuration similar to it.

The transmission bit string memory unit 281 stores therein a transmission bit string (to be described later) generated by the data generator 21. The modulating clock generator 282 generates a clock having a frequency for modulating the transmission bit string by the BPSK modulator 284. When the data generator 21 has generated the transmission bit string, the BPSK modulator 284 BPSK-modulates the transmission bit string in accordance with the clock frequency generated by the modulating clock generator 282 and outputs the BPSK-modulated transmission bit string to a mixer 285.

The transmission timing unit 283 controls a timing (transmission interval) provided to allow the mixer 285 to transmit the BPSK-modulated transmission bit string. Specifically, when the mixer 285 transmits a positional information signal through the antenna 30, the transmission timing unit 283 determines whether a predetermined time has elapsed (e.g., 3 seconds have elapsed) as will be described later. When it is determined that the predetermined time has elapsed, the transmission timing unit 283 allows the mixer 285 to transmit a positional information signal again. Thus, the transmission timing unit 283 controls, in such a manner as to cause the mixer 285 to repeatedly transmit positional information signals in different periods, their timings.

In the present embodiment, the transmission timing units 283 are respectively provided in the wireless transmission sections (1) 271 through (6) 276. They may however be combined into one to control the timings provided to transmit their positional information signals. For example, such a transmission timing unit 283 may control the mixer 285 in such a manner that the mixer 285 sequentially transmits positional information signals each having a modulated transmission bit string outputted from the wireless transmission section (1) 271 in a period per second, for example and control the mixer 285 in such a manner that the mixer 285 sequentially transmits positional information signals each having a modulated transmission bit string outputted from the wireless transmission section (2) 272 in a period per 2 seconds, for example. Thus, the transmission timing unit 283 controls the mixer 285 to transmit a plurality of positional information signals in different periods.

As to a method for determining the timing provided to transmit the positional information signal by the transmission timing unit 283, for example, a time obtained by multiplying the number of frames 200 and 205 configuring the positional information signal, the number of bits therefor, a transmission time per frame or the number of wireless transmission sections of the same coordinate (since the two wireless transmission sections (1) 271 and (2) 272 exist with respect to the positional information (x1) in the present embodiment, for example, the number thereof is two) and a transmission time thereof by each other may be set as one period and determined as the timing provided to transmit the position information signal. Such a transmission timing is assumed to be determined in advance by a manager or the like.

The mixer 285 generates a positional information signal from the respective BPSK-modulated transmission bit strings outputted from the wireless transmission sections (1) 271 through (6) 276 and transmits the generated positional information signal via the antenna 30.

Incidentally, in the present embodiment, the mixer 285 sequentially transmits the positional information signals at the predetermined intervals according to the instructions issued from the transmission timing units 283 or the like of the wireless transmission sections (1) 271 through (6) 276. The mixer 285 may, however, function in the following manner: When the mixer 285 receives the transmission bit string BPSK-modulated by each wireless transmission section, e.g., it is determined whether the mixer 285 has received the transmission bit string of each coordinate of the positional information transmitter 2. When it is determined that the mixer 285 has received the transmission bit string of each coordinate, positional information signals are generated with respect to the respective positional information (x1), (y1) and (z1). The mixer 285 may transmit these in sync with one another (transmitted at the same timing). Transmitting the positional information signals about the respective coordinates of the positional information transmitter 2 in sync with one another (in cooperation with one another) in this way enables a reduction in processing taken where the portable terminal 3 receives each positional information signal therein and outputs it to an application.

Figure 6:
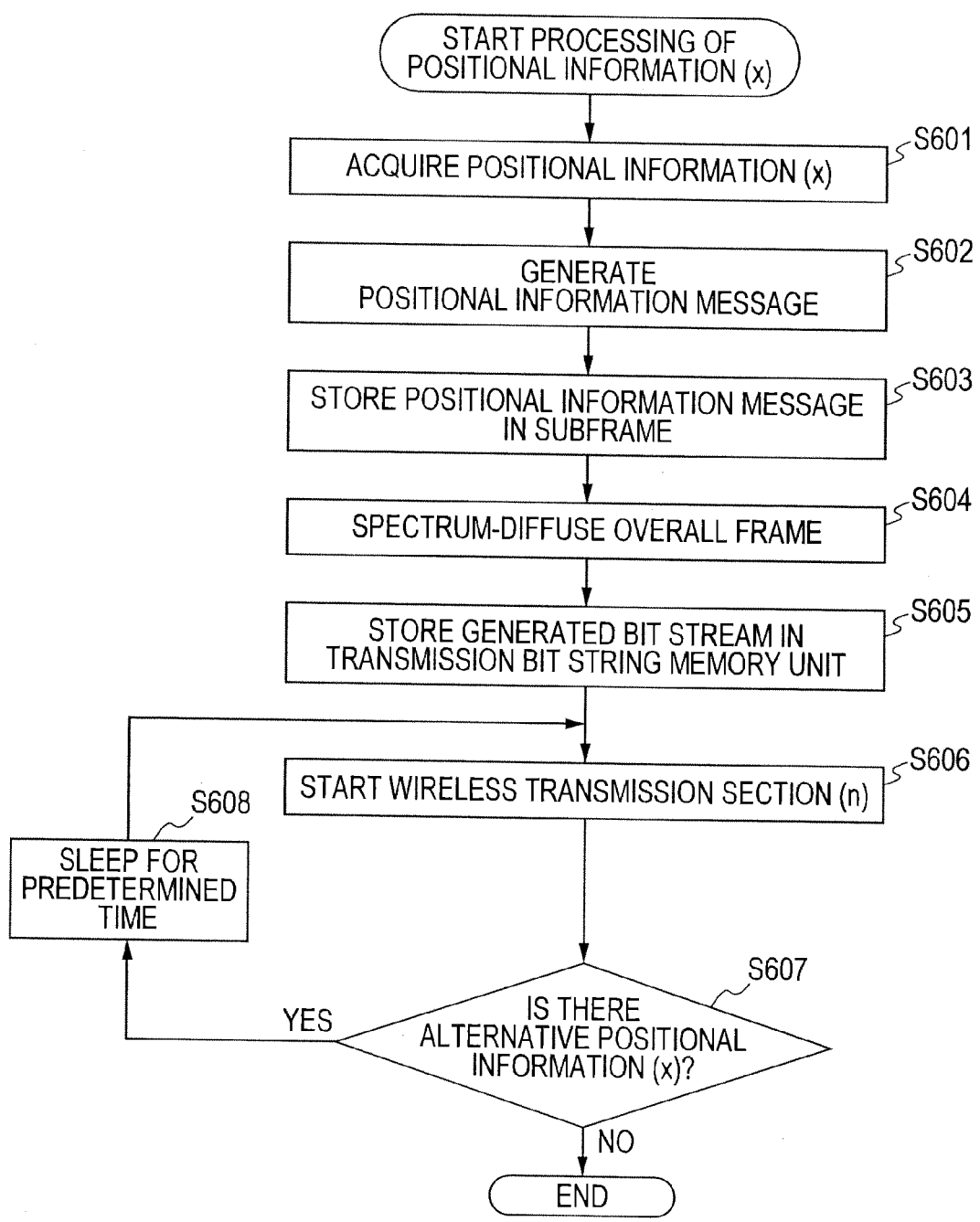
FIG. 6 is a flowchart showing a processing procedure of a positional information transmission process.

Subsequently, a description will given to a process (positional information transmission process) taken where positional information (x1) is transmitted at the positional information transmission program 213 executed by the data generator 21. FIG. 6 is a flowchart showing a processing procedure of the positional information transmission process.

Incidentally, in the following description, the characters of "S" applied prior to the reference numerals means steps respectively. Assume that the positional information transmitter 2 receives an ON signal for turning the power on from an unillustrated power switch or the like, and the power unit 26 is in a state of its drive power being supplied to the respective parts of the positional information transmitter 2. Although only the processing procedure about the positional information (x1) is shown below, processing similar to it is assumed to be performed even on other positional information (e.g., positional information (y1) and positional information (z1), etc.).

As shown in FIG. 6, the data generator 21 first acquires positional information (x1) included in a positional information signal from the positional information table 214 when the drive power is supplied from the power unit 26 (S601). Then, the data generator 21 generates each positional information message including a payload (1) 203 including the acquired positional information, a message type 202, etc. (S602) and stores the generated positional information message in a subframe (S603).

Then, the data generator 21 spectrum-diffuses navigation messages comprised of subframes each having stored the positional information message therein according to code patterns corresponding to the respective PRN numbers registered in the positional information table 214 and thereby generates respective transmission bit strings to be transmitted (S604). The data generator 21 stores the generated transmission bit strings in the transmission bit string memory unit 281 of each wireless transmission section 271 (S605), and starts the BPSK modulator 284 of the wireless transmission section 271 (S606).

The data generator 21 determines referring to the positional information table 214 whether an alternative wireless transmission section 271 corresponding to the positional information (x1) exists (S607). When it is determined that the wireless transmission section 271 corresponding to the positional information (x1) exists (S607; Yes), the data generator 21 sleeps for a predetermined period and returns to S606. On the other hand, when it is determined that there is no wireless transmission section 271 corresponding to the positional information (x1) (S607; No), the processing is ended. When the process of S607 is terminated, all processes or process steps for the positional information transmission process shown in FIG. 6 are completed.

Thus, the respective wireless transmission sections (1) 271 through (6) 276 respectively output the transmission bit strings stored in the transmission bit string memory units 281. The mixer 285 repeatedly transmits, in a predetermined cycle, positional information signals each including the same positional information (x1), encoded using different PRN numbers, through the antenna 30. As described above, similar processing is performed even in the case of the positional information (y1) and the positional information (z1). The portable terminal 3 will subsequently be explained.

Figure 7:
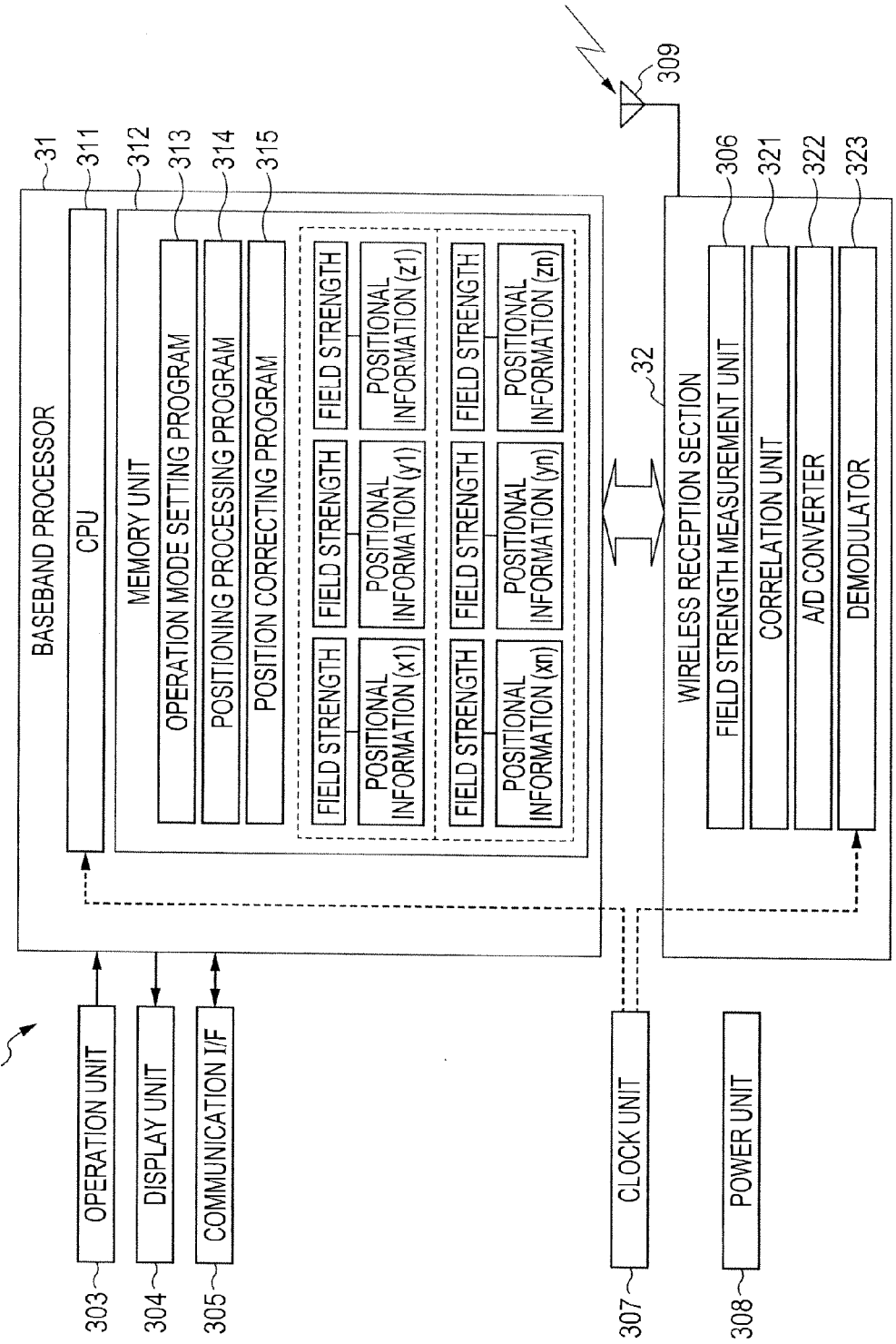
FIG. 7 is a functional block diagram of a portable terminal which receives a positional information signal transmitted from a positional information transmitter therein to measure its position.

FIG. 7 is a functional block diagram of the portable terminal 3 which receives a positional information signal sent from a positional information transmitter 2 therein and thereby performs positioning. As shown in FIG. 7, the portable terminal 3 includes a baseband processor 31, a wireless reception section 32, an operation unit 303, a display unit 34, a communication I/F unit 305, a clock unit 307, and a power unit 308. As described above, the portable terminal 3 is of a portable terminal such as a cellular phone equipped with, for example, a GPS reception device and a GPS positioning function.

The baseband processor 31 includes a CPU 311 and a memory unit 312. The CPU 311 loads various programs stored in the memory unit 312 into an unillustrated memory and executes the same to thereby embody various functions of the portable terminal 3. Concrete processes conducted by the baseband processor 31 will be described later using FIG. 8.

The memory unit 312 is of a non-volatile memory such as a Random Access Memory (RAM), a Read Only Memory (ROM), a flash memory or the like. An operation mode setting program 313 for causing the baseband processor 31 to execute an operation mode setting function for setting an operation mode of the portable terminal 3, a positioning processing program 314 for causing the baseband processor 31 to execute a positioning processing function for acquiring its own present position, and a position correcting program 315 for causing the baseband processor 31 to execute a correction processing function for correcting its own present position have been stored in the memory unit 312.

The wireless reception section 32 includes a field strength measurement unit 306, a correlation unit 321, an A/D converter 322, a demodulator 323 and an antenna 309.

The field strength measurement unit 306 is configured by, for example, a Carrier power to Noise ratio (CNo) circuit and inputs a signal indicative of the field strength of a received wireless signal to the baseband processor 31. Specifically, the field strength measurement unit 306 determines whether the positional information signal transmitted from the positional information transmitter 2 has been received by the antenna 309. When the baseband processor 31 has acquired a message type from the positional information signal, as will be described later, the field strength measurement unit 306 measures the field strength of the acquired positional information signal and stores the measured value in the memory unit 312 in association with positional information (e.g., each of positional information (x1), (y1) and (z1)) included in the positional information signal.

The demodulator 323 generates, in accordance with a clock signal inputted from the clock unit 307, a signal (hereinafter called "received signal") obtained by demodulating (BPSK-demodulating) a positional information signal in analog signal form, of a carrier transmitted from the corresponding positional information transmitter 2 and captured by the antenna 309, and inputs the so-generated received signal to the A/D converter 322. The A/D converter 322 converts the received signal inputted from the demodulator 323 to a digital signal (received bit stream signal).

The correlation unit 321 is equipped with a plurality of unillustrated correlators capable of parallel operation (tracking a plurality of channels corresponding to different PRN numbers simultaneously). The respective correlators individually set the channels or PRN numbers to be demodulated by them through managers or users or the like and have thereinside storage media (not shown) such as memories that store their settings therein. Each of the correlators decodes the received bit stream signal inputted from the A/D converter 322 by a replica pattern (code pattern for decoding generated from each PRN number) and outputs the post-decoding positional information signal (digital data) to the baseband processor 31.

The clock unit 307 generates a clock signal for operating the CPU 311 and a clock signal (e.g., 1.0243 MHz) necessary for the decoding operation of the demodulator 323. The clock unit 307 includes an oscillator such as a Temperature Compensated Crystal Oscillator (TCXO) or the like. The power unit 308 supplies drive power to the respective parts of the portable terminal 3.

The operation unit 303 is of a user interface for performing an operation input on the portable terminal 3 and includes control buttons or dials or the like. The display unit 304 is of a user interface for displaying various information and includes, for example, a liquid crystal monitor or an organic EL panel or the like. The communication I/F unit 305 is of a communication interface for coupling the portable terminal 3 to an external device and includes, for example, RS-232C, a UART, an open collector, TTL, a parallel I/F, a USB or the like.

Figure 8:
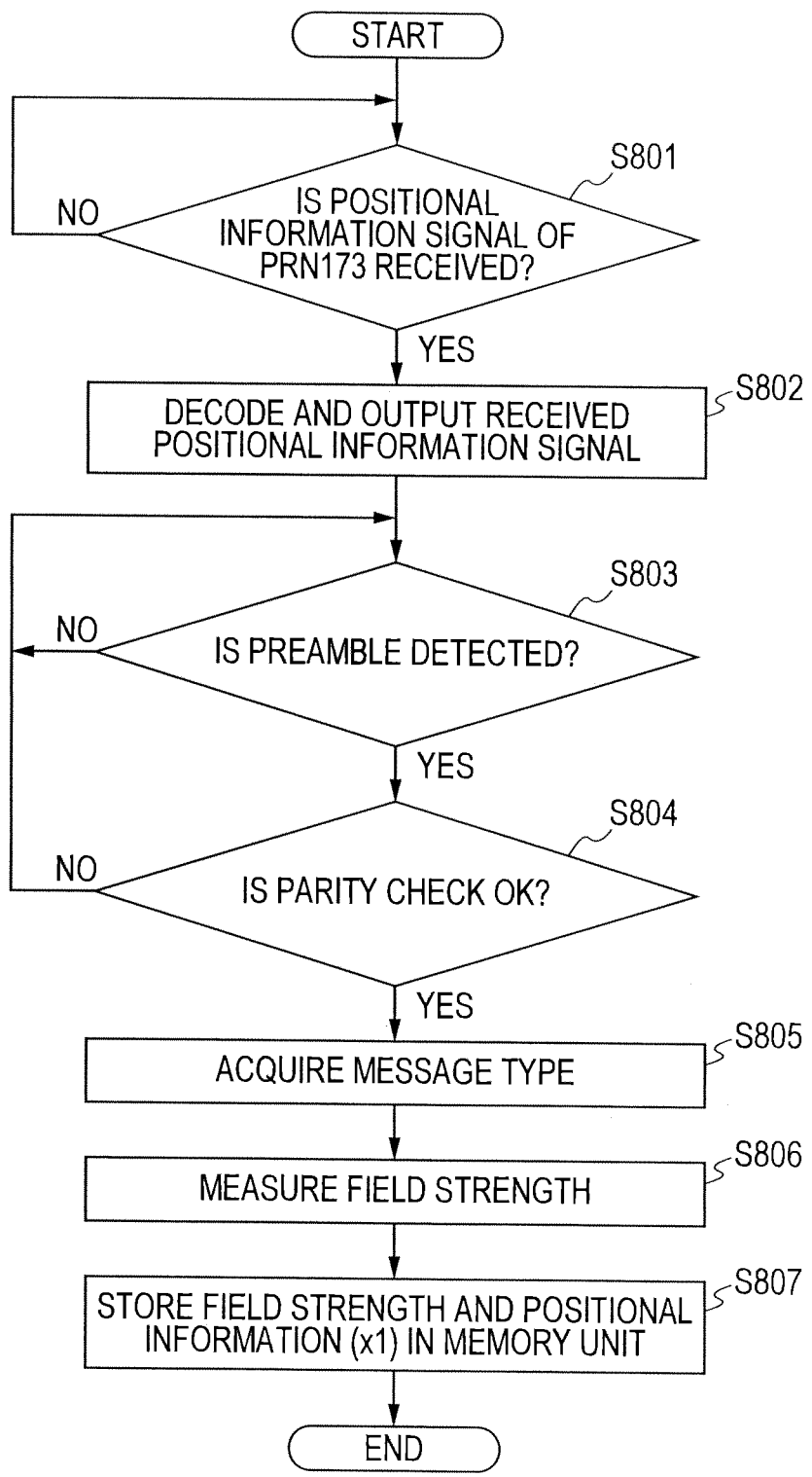
FIG. 8 is a flowchart showing a processing procedure of a positional information acquiring process.

A process (positional information acquiring process) for acquiring positional information from a positional information signal at the portable terminal 3 will subsequently be explained. FIG. 8 is a flowchart showing a processing procedure of the positional information acquiring process.

Incidentally, although the processing procedure taken where the portable terminal 3 receives, as a positional information signal, a positional information signal corresponding to the PRN number 173, i.e., a positional information signal including positional information (x1) from the corresponding positional information transmitter 2 is explained below, processing similar to the above is assumed to be performed each time the positional information transmitter 2 receives each positional information signal transmitted in a predetermined period, even in the case of the reception of positional information signals including other positional information.

As shown in FIG. 8, the portable terminal 3 first determines through the field strength measurement unit 306 of the wireless reception section 32 whether the antenna 309 has received a positional information signal from the positional information transmitter 2 (S801). When it is determined that the positional information signal has not been received (S801; No), the portable terminal 3 stands by as it is.

On the other hand, when the field strength measurement unit 306 determines that the antenna 309 has received the positional information signal from the positional information transmitter 2 (S801; Yes), the correlation unit 321 decodes the received positional information signal and outputs it to the memory unit 312 of the baseband processor 31 (S802). Then, the baseband processor 31 determines whether a preamble 201 exists in the decoded positional information signal (S803). When the baseband processor 31 has determined that no preamble 201 exists in the received positional information signal (S803; No), it stands by as it is.

On the other hand, when it is determined that the preamble 201 exists in the decoded positional information signal (S803; Yes), the baseband processor 31 further refers to a parity 204 included in the same subframe as for the preamble 201 and thereby checks (parity checks) for the presence or absence of a bit error in the positional information signal (S804). When the baseband processor 31 has determined that the bit error in the positional information signal exists (parity check is not OK) (S804; No), it returns to Step S803 and stands by as it is.

On the other hand, when it is determined that no bit error exists in the positional information signal (parity check is OK) (S804; Yes), the baseband processor 31 acquires a message type from the positional information signal (S805).

When the baseband processor 31 has acquired the message type from the positional information signal, the field strength measurement unit 306 measures the field strength of the positional information signal including the message type, and the baseband processor 31 stores the measured field strength and positional information (e.g., positional information (x)) contained in the positional information signal in the memory unit 312 in association with each other (S807). When the process of S807 is completed, all the processes or process steps for the positional information acquiring process shown in FIG. 8 are terminated.

When the above positional information acquiring process is conducted, the baseband processor 31 performs a positional information specifying process for specifying a positional information transmitter 2 closest to the portable terminal 3 at a timing (for each second, for example) determined in advance.

Figure 9:
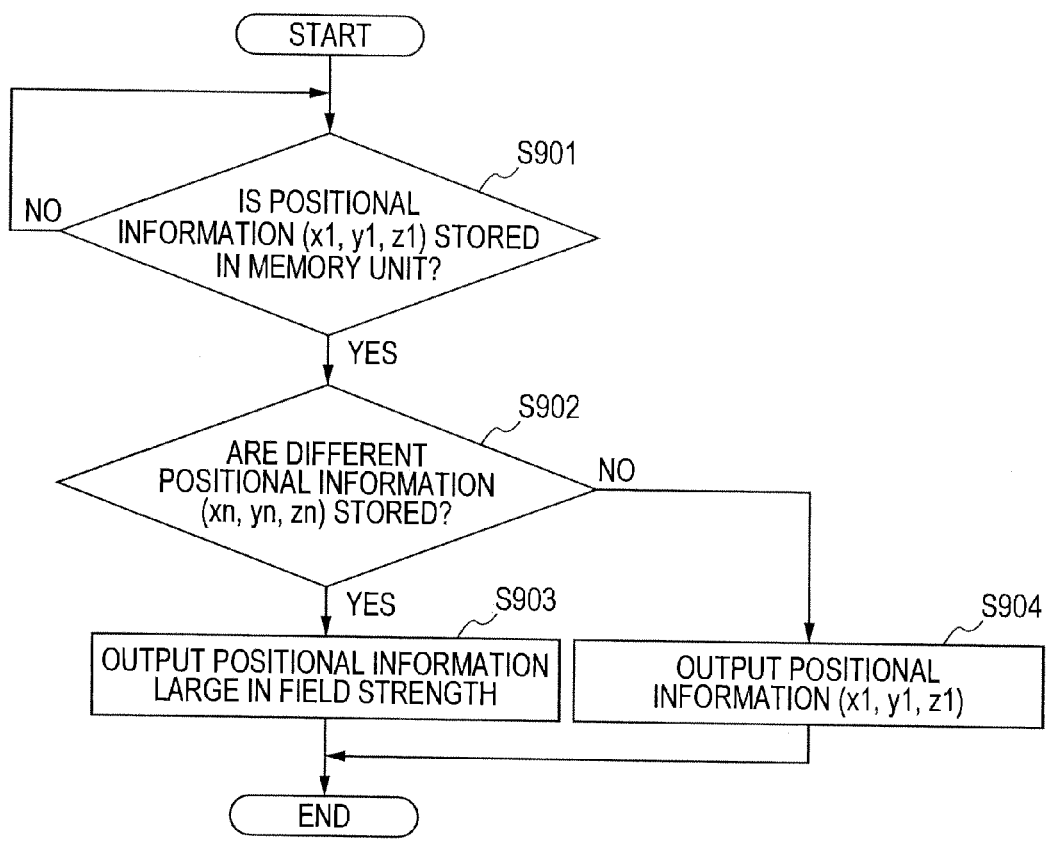
FIG. 9 is a flowchart showing a processing procedure of a positional information specifying process.

FIG. 9 is a flowchart showing a processing procedure of the positional information specifying process. As shown in FIG. 9, the baseband processor 31 determines whether the positional information (x1), positional information (y1) and positional information (z1) have been stored in the memory unit 312 (S901). When the baseband processor 31 has determined that the positional information (x1), positional information (y1) and positional information (z1) have not been stored in the memory unit 312 (S901; No), it stands by as it is.

On the other hand, when the baseband processor 31 has determined that the positional information (x1), positional information (y1) and positional information (z1) have been stored in the memory unit 312 (S901; Yes), the baseband processor 31 further determines whether positional information (xn), positional information (yn) and positional information (zn) different from the positional information (x1), positional information (y1) and positional information (z1) have been stored in the memory unit 312 (S902).

When it is determined that the different positional information (xn), (yn) and (zn) have been stored in the memory unit 312 (S902; Yes), the baseband processor 31 outputs positional information large in field strength to an application (not shown) as the current location (S903).

On the other hand, when it is determined that the different positional information (xn), (yn) and (zn) have not been stored in the memory unit 312 (S902; No), the baseband processor 31 outputs the positional information (x1), positional information (y1) and positional information (z1) stored in the memory unit 312 to the application as the current location (S904). Timings at which the baseband processor 31 output these information, are sequentially conducted or provided each time the wireless reception section 32 receives these information therein and thereafter the positional information (x1), (y1) and (z1) are stored in the memory unit 312. When the process of S903 or S904 is ended, all the processes for the positional information specifying process shown in FIG. 9 are completed. Since the baseband processor 31 outputs the positional information about the positional information signal large in field strength, of the positional information signals received by the portable terminal 3, to the application, a user is able to measure the position appropriately.

Thus, in the position measuring system 1000 having the position information transmitters 2 each of which transmits each positional information signal for specifying the current position, and the portable terminals 3 each of which receives the positional information signal therein, the position information transmitter 2 is provided wherein the memory unit 212

(positional information table 214) stores a plurality of positional information (x1) each indicative of the latitude of the present position and a plurality of positional information (y2) each indicative of the longitude of the present position, the mixer 285 generates a first positional information signal being a wireless signal including the positional information (x1) stored in the memory unit 212, and a second positional information signal being a wireless signal including the positional information (y2) and transmits the first and second positional information signals generated in this way, the wireless transmission section (1) (transmission timing unit 283) controls the mixer 285 in such a manner as to repeatedly transmit the first positional information signal in different cycles and repeatedly transmit the second positional information signal in different cycles; and the portable terminal 3 is provided wherein the wireless reception section 32 repeatedly receives the first positional information signal in the different cycles from the positional information transmitter 2 and repeatedly receives the second positional information signal in the different cycles therefrom, the correlation unit 321 sequentially decodes the first and second positional information signals repeatedly received by the wireless reception section 32, and the baseband processor 31 sequentially outputs the first and second positional information signals decoded by the correlation unit 321. It is therefore possible to appropriately measure the corresponding position under any moving circumstances. It is possible to overcome a problem about multipath fading produced when the portable terminal 3 is moved at a walking speed or so while holding it indoors in which each positional information transmitter 2 is installed, where, for example, a user measures the current position thereof by a positioning system for acquiring the current positions both outdoors and indoors. Further, the position can be measured even while moving the portable terminal 3 at the walking speed or so.

Figure 10:
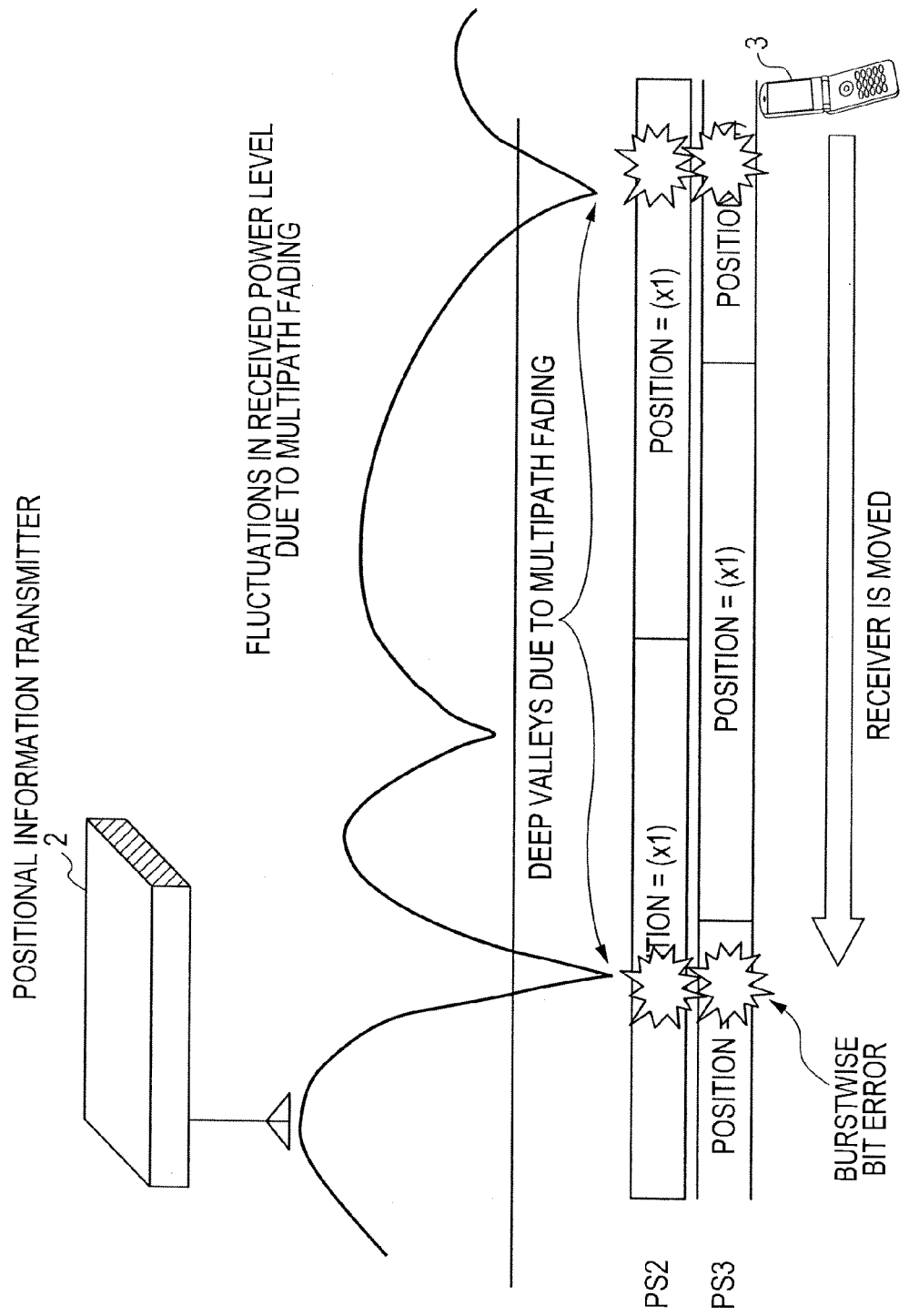
FIG. 10 is an image diagram taken where a moving portable terminal receives each positional information signal when multipath fading has occurred.

FIG. 10 is an image diagram taken where a moving portable terminal 3 receives each positional information signal when multipath fading has occurred. As shown in FIG. 10, positional information signals PS2 and PS3 each including positional information (x1) are sequentially transmitted from a positional information transmitter 2 with both being shifted by a predetermined period. Therefore, the positional information signal (positional information signal PS2 in the example shown in FIG. 10) is transmitted at a timing at which the multipath fading is occurring. Even where the portable terminal 3 is not able to receive the positional information signal, the positional information signal (positional information signal PS3 in the example shown in FIG. 10) is transmitted at a timing shifted by a predetermined cycle and received by the portable table 3. Therefore, even where the multipath fading is occurring, the position can be measured appropriately. For example, each individual positional information can be shortened to one or two frames, i.e. 30 or 60 bits or so as the amount of data, or 0.6 to 1.2 seconds in time span. Therefore, since the frame is small even if a burstwise bit error has occurred, it is possible to receive the next frame relatively early.

Incidentally, in order to avoid the effects of multipath fading, six or more positional information may more preferably be transmitted assuming the numbers of positional information (xn), positional information (yn) and positional information (zn) of respective coordinates to be twice respectively, if the number of positional information signals transmitted from the same positional information transmitter 2 needs, for example, three dimensions as positional information. Since the effects of multipath fading are related to the positions of transmitting and receiving antennas, the six or more positional information signals are preferably mixed or blended by a mixer and transmitted from the same antenna, but may be divided into a plurality of antennas.

Incidentally, the present invention is not limited to the above embodiments in situ, but can be embodied by modifying components within the scope not departing from the gist of the invention in the implementation phase. Various inventions can be formed by combining a plurality of components disclosed in the above embodiments as appropriate. For example, some components may be eliminated from all the components shown in the embodiments. Further, the components used throughout the different embodiments may be combined as appropriate.

What is claimed is:

1. A positional information transmitter, comprising:
    a memory unit which stores a plurality of different positional information of a specified position;
    a wireless transmission unit configured to generate a plurality of positional information signals, each of the plurality of positional information signals including a different one of the positional information of the specified position and using a different Pseudo Random Noise (PRN) number and to transmit the plurality of positional information signals in parallel; and
    a timing controller configured to control the wireless transmission unit in such a manner that the wireless transmission unit transmits the plurality of positional information signals in each of a plurality of different cycles.

2. The positional information transmitter according to claim 1, wherein there are a plurality of the timing controllers, and
    wherein the wireless transmission unit is configured to transmit wirelessly the plurality of positional information signals in parallel according to instructions issued from the respective timing controllers.

3. The positional information transmitter according to claim 2, wherein the memory unit stores each of the plurality of positional information as navigation messages each comprised of one or plural frames,
    wherein the positional information transmitter further includes a generator configured to generate a plurality of bit data in which each of the plurality of navigation messages stored in the memory unit are spectrum-diffused according to predetermined code patterns, and to output the plurality of bit data to the wireless transmission unit, and
    wherein the wireless transmission unit is configured to transmit wirelessly the positional information signals each in parallel including the plurality of bit data generated by the generator.

4. The positional information transmitter according to claim 3, wherein the positional information signals have compatibility with a satellite positioning signal.

5. The positional information transmitter according to claim 2, wherein the wireless transmission unit is configured to transmit in parallel the plurality of positional information signals from one antenna.

6. The positional information transmitter according to claim 1, wherein each of the plurality of different positional information for the specified position are indicative of the latitude and longitude of the specified position.

7. The positional information transmitter according to claim 6, wherein the memory unit further stores positional information indicating an altitude of the specified position,
    wherein the wireless transmission unit is configured to generate a plurality of positional information signals including the positional information indicating the altitude of the specified position and the positional information indicating the latitude and the longitude of the specified position, and to transmit wirelessly the generated plurality of signals in parallel, and wherein the timing controller is configured to control the wireless transmission unit in such a manner that the wireless transmission unit transmits the positional information signals indicating the altitude, latitude and longitude of the specified position in each of the different cycles.

8. A positional information receiver which receives positional information, comprising:

a wireless reception section configured to receive, in each of a plurality of different cycles, in parallel positional information signals each using a different Pseudo Random Noise (PRN) number and including a different one of a plurality of different positional information of a specified position;

a decoding unit configured to sequentially decode the plurality of positional information signals received in parallel by the wireless reception section in each of the different cycles; and an output processing unit configured to sequentially output the plurality of the positional information signals decoded by the decoding unit.

9. The positional information receiver according to claim 8, further including a measurement unit configured to measure a field strength of the plurality of positional information signals received by the wireless reception section.

10. The positional information receiver according to claim 9, wherein the plurality of the positional information signals received in parallel by the wireless reception section in the different cycles include positional information indicative of an altitude of the specified position and positional information indicating the latitude and the longitude of the specified position.

11. A position measuring system comprising:

at least one positional information transmitter configured to transmit positional information for specifying a current position; and at least one positional information receiver configured to receive the positional information therein, wherein the positional information transmitter includes:

a memory unit which stores a plurality of different positional information of a specified position, a wireless transmission unit configured to generate a plurality of positional information signals, each of the plurality of positional information signals including a different one of the positional information of the specified position and using a different Pseudo Random Noise (PRN) number stored in the memory unit and to transmit wirelessly the plurality of positional information signals in parallel, and a timing controller configured to control the wireless transmission unit in such a manner that the wireless transmission unit transmits the plurality of positional information signals in each of a plurality of different cycles, and wherein the positional information receiver includes:

a wireless reception section configured to receive in parallel the plurality of positional information signals in each of the different cycles from the positional information transmitter, a decoding unit configured to sequentially decode the positional information signals received in parallel by the wireless reception section in the different cycles; and an output processing unit configured to sequentially output a plurality of the positional information signals decoded by the decoding unit.

* * * * *